(12) United States Patent
Pon et al.

(10) Patent No.: US 11,474,304 B2
(45) Date of Patent: Oct. 18, 2022

(54) LIGHT SCREEN OF FIBER OPTIC CONNECTORS

(71) Applicant: Dongguan Yuqiu Electronic Co., Ltd, Wenzhou (CN)

(72) Inventors: Wenfu Pon, Guangdong (CN); Shangsheng Cai, Guangdong (CN); Chonghuan Hu, Guangdong (CN); Lifei Wang, Guangdong (CN)

(73) Assignee: Dongguan Yuqiu Electronic Co., Ltd, Dongguan (CN)

( * ) Notice: Subject to any disclaimer, the term of this patent is extended or adjusted under 35 U.S.C. 154(b) by 9 days.

(21) Appl. No.: 17/121,787

(22) Filed: Dec. 15, 2020

(65) Prior Publication Data

US 2022/0003939 A1 Jan. 6, 2022

(51) Int. Cl.
*G02B 6/38* (2006.01)

(52) U.S. Cl.
CPC ......... *G02B 6/3849* (2013.01); *G02B 6/3825* (2013.01)

(58) Field of Classification Search
None
See application file for complete search history.

(56) References Cited

U.S. PATENT DOCUMENTS

| 5,708,745 | A | * | 1/1998 | Yamaji | G02B 6/3849 |
| | | | | | 385/139 |
| 6,039,585 | A | * | 3/2000 | Kim | H01R 13/5219 |
| | | | | | 385/139 |
| 6,685,362 | B2 | * | 2/2004 | Burkholder | G02B 6/3849 |
| | | | | | 439/607.34 |
| 9,523,822 | B2 | * | 12/2016 | Miller | G02B 6/3849 |
| 10,545,295 | B1 | * | 1/2020 | Sato | G02B 6/3825 |
| 2004/0223701 | A1 | * | 11/2004 | Tanaka | G02B 6/3897 |
| | | | | | 385/55 |

* cited by examiner

*Primary Examiner* — Rhonda S Peace

(57) ABSTRACT

A light screen of fiber optic connectors. The light screen of fiber optic connectors comprises a metal framework, a first metal spring tab and a second metal spring tab integrally formed inside the metal framework and distributed oppositely, and the end of the first metal spring tab and the end of the second metal spring tab are staggered, forming a spring tab opening-closing structure for shielding light. This new type of light screen is made of sheet metal, which has a certain strength, convenient for automatic assembly in late stage, and the first metal spring tab and the second metal spring tab of the light screen have excellent recovery capability, convenient to use, and the lifetime is longer. In addition, this new model has simple structure, very simple production technique and convenient assembly, so that this new model has very strong marketability.

5 Claims, 5 Drawing Sheets

LIGHT SCREEN OF FIBER OPTIC CONNECTORS

BACKGROUND OF INVENTION

1. Field of the Invention

This new model relates generally to the domain of communication technology, and more particularly to a light screen of fiber optic connectors.

2. Description of Related Art

With the popularization of FTTH (Fiber To The Home), more and more optical fibers shall be connected in the optical fiber network. One optical fiber connection method is to directly insert the optical connector plug installed at the front end of optical fiber into the adapter. This connection mode is convenient for removal, more flexible than the old connection modes, e.g. soldering.

In the existing technology, in order to prevent dust and shield light rays, a light shielding structure is provided at the socket of fiber optic adapter, when there is no fiber optic plug inserted, the light shielding structure prevents dust, and the optical element in the fiber optic adapter is shielded from light rays. When a fiber optic plug is inserted, the light shielding structure is pushed away, the head of fiber optic plug is aligned with the optical element, and the light emitted from the fiber optic plug can directly shoot at the optical element, so as to implement communication.

The light shielding structure of the existing technology comprises a pivot gate and a torsion spring for driving the pivot gate to return. This structure has a lot of parts, it is difficult to be assembled, adverse to enhancing the marketability. In addition, there are light screens made of lighttight plastics, silica gel or rubber, but they are soft, adverse to automatic assembly, and additional structures are required for positioning, the cost is increased.

In view of this, this inventor proposes the following technical proposal.

SUMMARY OF THE INVENTION

The purpose of the present invention is to overcome the shortcomings of the prior art and provide a light screen of fiber optic connectors comprising:

a metal framework, a first metal spring tab and a second metal spring tab integrally formed inside the metal framework and distributed oppositely, and an end of the first metal spring tab and an end of the second metal spring tab are staggered, forming a spring tab opening-closing structure for shielding light.

More particularly, wherein the metal framework has a window for the fiber optic plug to pass through, the first metal spring tab and the second metal spring tab are exposed to a window and shielding the window.

More particularly, wherein the first metal spring tab is integrally formed on a lower edge of the window in the metal framework by die cutting.

More particularly, wherein the second metal spring tab is arranged at a back end of an upper edge of the window in the metal framework by recurvation molding, and the end of the second metal spring tab contacts the backside of the end of the first metal spring tab.

More particularly, wherein the width of root of the joint of the first metal spring tab and metal framework is larger than the width of the end of the first metal spring tab, the first metal spring tab is trapezoidal.

More particularly, wherein the width of root of the joint of the second metal spring tab and metal framework is larger than the width of the end of the second metal spring tab.

More particularly, wherein the light screen is inserted in the plastic holder of the fiber optic connector from bottom to top.

More particularly, wherein an insertion slot is arranged upwards in a lower end face of the plastic holder, the light screen is inserted in the insertion slot, and the root of joint of the second metal spring tab and metal framework contacts the inner wall of insertion slot, a limit piece for sealing the insertion slot is fixed to the lower end of the plastic holder, the limit piece contacts a lower end of light screen.

After adopting the above technical solution, compared with the prior art, the present invention has the following beneficial effects:

The light screen is made of sheet metal, which has a certain strength, convenient for automatic assembly in late stage, and the first metal spring tab and the second metal spring tab of the light screen have excellent recovery capability, more convenient to use, and the lifetime is longer. In addition, this new model has simple structure, very simple production technique and convenient assembly, so that this new model has very strong marketability.

DETAILED DESCRIPTION OF THE INVENTION

Described with attached figures below.

Figure 1:
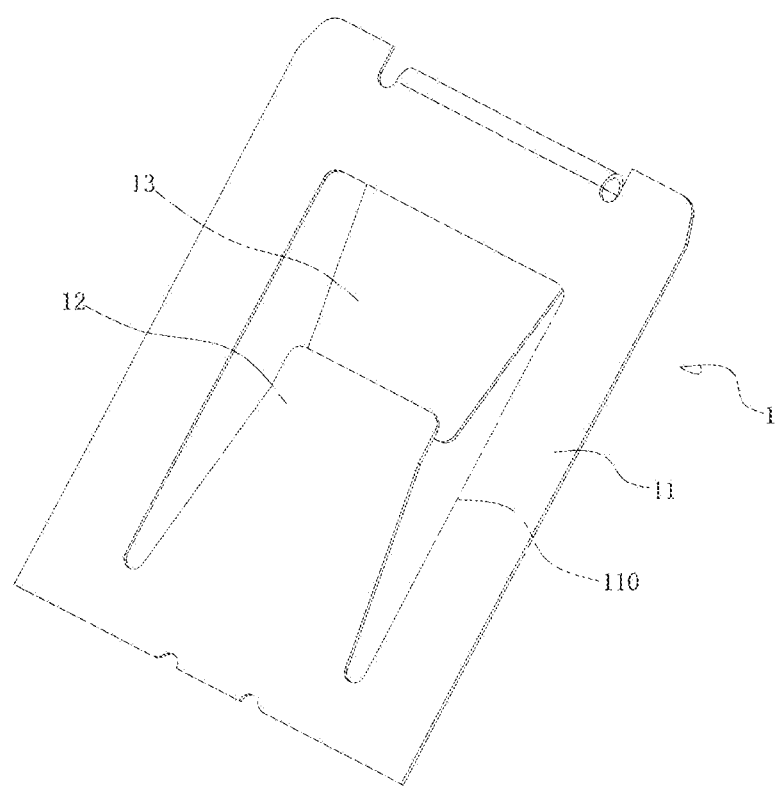
FIG. 1 is a stereogram of this new model.
Figure 2:
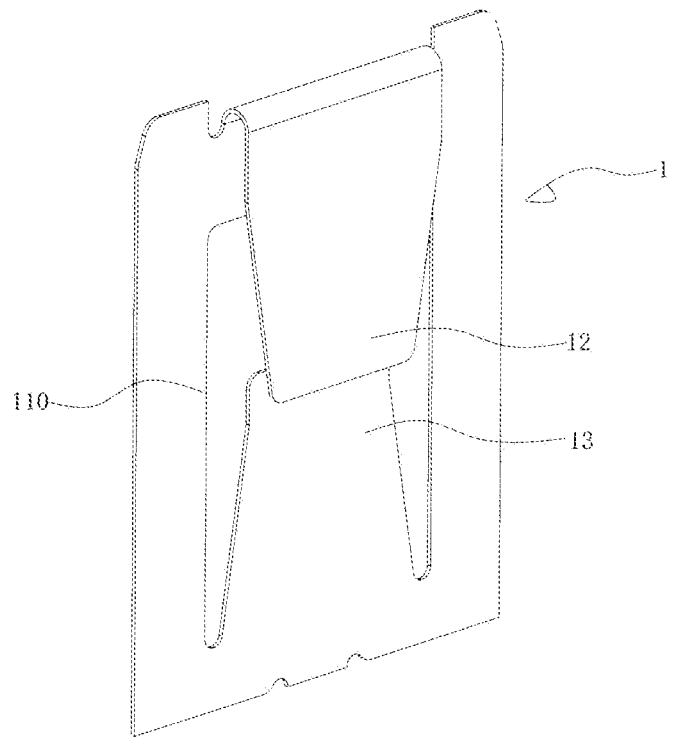
FIG. 2 is a stereogram of this model from another viewing angle.
Figure 5:
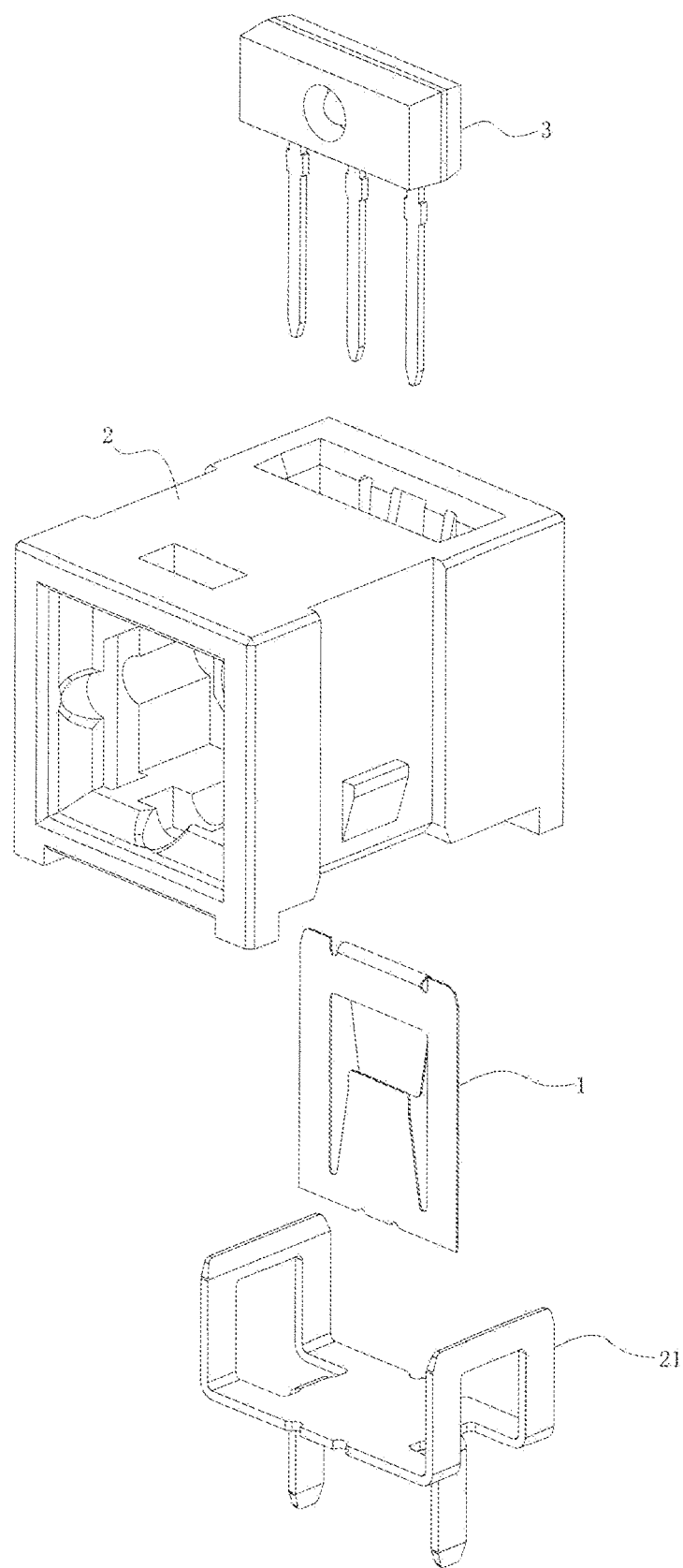
FIG. 5 is a three-dimensional exploded diagram of a fiber optic connector equipped with this new model.

FIGS. 1-2 show a light screen of fiber optic connectors. The light screen 1 is a sheet metal, including a metal framework 11 and a first metal spring tab 12 and a second metal spring tab 13 integrally formed inside the metal framework 11 and distributed oppositely, and the end of the first metal spring tab 12 and the end of the second metal spring tab 13 are staggered, forming a spring tab opening-closing structure for shielding light. This new model uses a sheet metal as light screen, wherein the light screen 1 comprises a metal framework 11 and a first metal spring tab 12 and a second metal spring tab 13 integrally formed inside the metal framework 11 and distributed oppositely, and the end of the first metal spring tab 12 and the end of the second metal spring tab 13 are staggered, forming a spring tab opening-closing structure for shielding light. When the fiber optic plug is inserted in the fiber optic connector, the fiber optic plug pushes the spring tab opening-closing structure away, which is to say, the fiber optic plug pushes the first metal spring tab 12 and the second metal spring tab 13 away, and passes through between the first metal spring tab 12 and the second metal spring tab 13, so that the light emitted from the fiber optic plug can directly reach the optical element 3 in the fiber optic connector, attaining the goal for fiber-optic communication, as shown in FIG. 5. When the fiber optic plug, is withdrawn, the first metal spring tab 12 and the second metal spring tab 13 are resetted automatically, the shading function is recovered. Which is to say, this new type of light screen is made of sheet metal, it has a certain strength, favorable for automatic assembly in late stage, and the first metal spring tab 12 and the second metal spring tab 13 of the light screen have excellent recovery capability, more convenient to use, and the lifetime is longer. In addition, this new model has simple structure, very simple production technique and convenient assembly, so that this new model has very strong marketability.

The light screen 1 is a sheet metal, comprising a metal framework 11, a first metal spring tab 12 and a second metal spring tab 13 integrally formed by die cutting, wherein the second metal spring tab 13 is arranged at the back end of the metal framework 11 by recurvation molding, and the end of the second metal spring tab 13 contacts the backside of end of the first metal spring tab 12, the structure is very simple.

The metal framework has a window 110 for the fiber optic plug to pass through. The first metal spring tab 12 and the second metal spring tab 13 are exposed to the window 110 and shielding the window 110. Wherein the first metal spring tab 12 is integrally formed on the lower edge of window 110 in the metal framework 11 by die cutting. Wherein the second metal spring tab 13 is arranged at the back end of upper edge of window 110 in the metal framework 11 by recurvation molding, and the end of the second metal spring tab 13 contacts the backside of end of the first metal spring tab 12.

The width of the root of joint of the first metal spring tab 12 and metal framework 11 is larger than the width of the end of the first metal spring tab 12. The first metal spring tab 12 is trapezoidal, so that the first metal spring tab 12 has excellent elasticity. The width of the root of joint of the second metal spring tab 13 and metal framework 11 is larger than the width of the end of the second metal spring tab 13, so that the second metal spring tab 13 has excellent elasticity, too.

Figure 3:
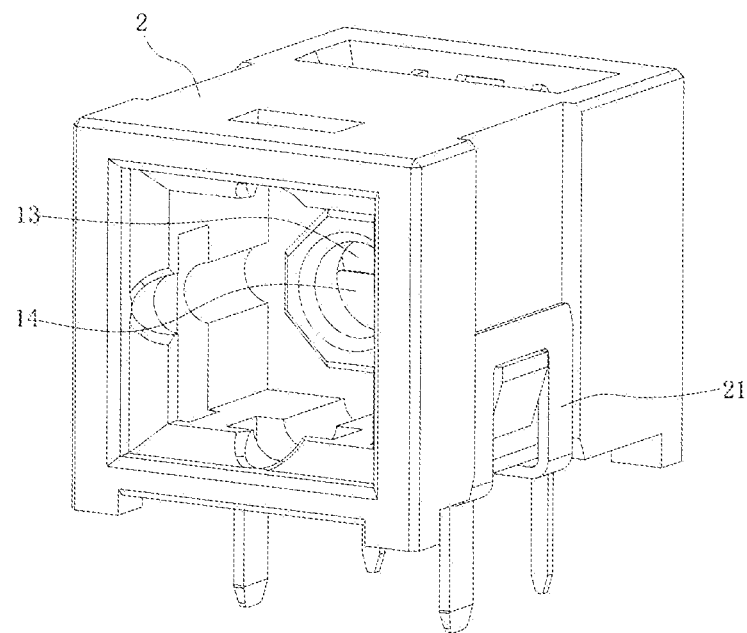
FIG. 3 is a stereogram of a fiber optic connector equipped with this new model.
Figure 4:
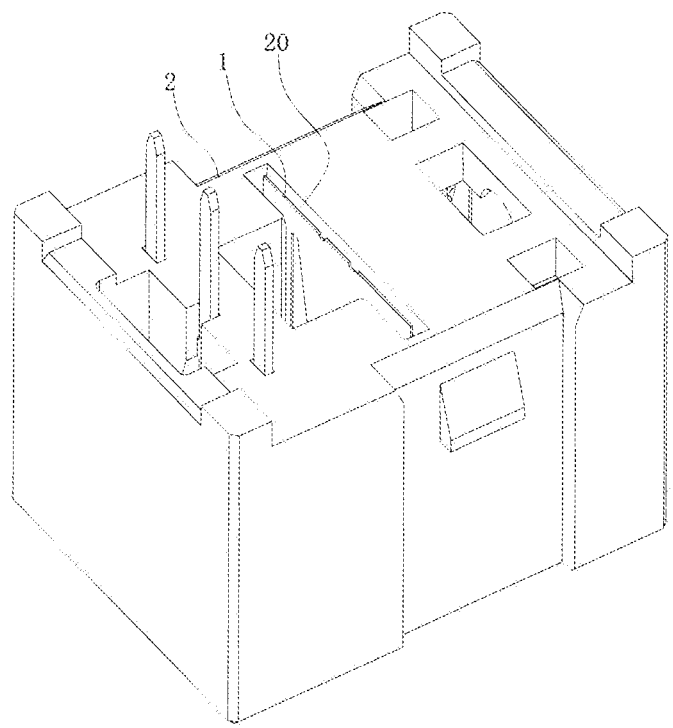
FIG. 4 is an assembly drawing of this new model and plastic holder.

As shown in FIGS. 3-5, the light screen 1 is inserted in the plastic holder 2 of the fiber optic connector from bottom to top. To be specific, an insertion slot 20 is formed upwards in the lower end face of the plastic holder 2, the light screen 1 is inserted in the insertion slot 20, and the root of the joint of the second metal spring tab 13 and metal framework 11 contacts the inner wall of insertion slot 20, so that the light screen 1 can be stably assembled in the insertion slot 20.

To further guarantee the stability of assembly, a limit piece 21 for sealing the insertion slot 20 is fixed to the lower end of the plastic holder 2, the limit piece 21 contacts the lower end of light screen 1, so as to prevent the light screen 1 from exiting by accident.

To sum up, this new type of the light screen is made of sheet metal, which has a certain strength, convenient for automatic assembly in late stage, and the first metal spring tab 12 and the second metal spring tab 13 of the light screen have excellent recovery capability, more convenient to use, and the lifetime is longer. In addition, this new model has simple structure, very simple production technique and convenient assembly, so that this new model has very strong marketability.

We claim:
1. A light screen of fiber optic connectors comprising:
a metal framework (11) in the shape of a flat plate, a first metal spring tab (12) and a second metal spring tab (13) integrally formed inside the metal framework (11) and distributed oppositely, and an end of the first metal spring tab (12) and an end of the second metal spring tab (13) are staggered, forming a spring tab opening-closing structure for shielding light;
wherein the metal framework (11) has a window (110) for a fiber optic plug to pass through, the first metal spring tab (12) and the second metal spring tab (13) are exposed in the window (110) and block the window (110);
the first metal spring tab (12) is integrally formed on a lower edge of the window (110) in the metal framework (11) by die cutting;
the first metal spring tab (12) is bent and folded to extend into the window (110) of the framework (11), the second metal spring tab (13) is formed by a flat plat, and one end of the second metal spring tab (13) contacts a rear side of one end the first metal spring tab.

2. The light screen of the fiber optic connectors defined in claim 1, wherein the width of root of the joint of the first metal spring tab (12) and metal framework (11) is larger than the width of the end of the first metal spring tab (12), the first metal spring tab (12) is trapezoidal.

3. The light screen of the fiber optic connectors defined in claim 1, wherein the width of root of the joint of the second metal spring tab (13) and metal framework (11) is larger than the width of the end of the second metal spring tab (13).

4. The light screen of the fiber optic connectors defined in claim 1, wherein the light screen (1) is inserted in a plastic holder (2) of the fiber optic connector from bottom to top.

5. The light screen of the fiber optic connectors defined in claim 4, wherein an insertion slot (20) is arranged upwards in a lower end face of the plastic holder (2), the light screen (1) is inserted in the insertion slot (20), and the root of joint of the second metal spring tab (13) and metal framework (11) contacts the inner wall of insertion slot (20), a limit piece (21) for sealing the insertion slot (20) is fixed to the lower end of the plastic holder (2), the limit piece (21) contacts a lower end of light screen (1).

* * * * *